(12) United States Patent
Porter et al.

(10) Patent No.: US 8,131,213 B2
(45) Date of Patent: Mar. 6, 2012

(54) SEA VESSEL TAGGING APPARATUS AND SYSTEM

(75) Inventors: William Luther Porter, Alexandria, VA (US); Thomas Kurt Nielsen, Oceanside, CA (US); Brendan Peter Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

(21) Appl. No.: 12/769,854

(22) Filed: Apr. 29, 2010

(65) Prior Publication Data

US 2010/0245120 A1 Sep. 30, 2010

Related U.S. Application Data

(63) Continuation-in-part of application No. 11/454,630, filed on Jun. 15, 2006, now Pat. No. 7,711,322.

(60) Provisional application No. 60/690,964, filed on Jun. 15, 2005, provisional application No. 60/690,966, filed on Jun. 15, 2005, provisional application No. 60/690,959, filed on Jun. 15, 2005.

(51) Int. Cl.
*H04B 13/02* (2006.01)

(52) U.S. Cl. ............. 455/40; 455/72; 455/502; 455/96; 455/98; 367/131; 367/142; 367/904; 367/901; 340/572.1; 340/572.4; 340/850

(58) Field of Classification Search .................... 455/40, 455/72, 96, 98, 502; 367/131, 901, 904; 367/142; 340/850
See application file for complete search history.

(56) References Cited

U.S. PATENT DOCUMENTS

| 3,967,201 | A | * | 6/1976 | Rorden ...................... 340/854.5 |
| 4,951,263 | A | * | 8/1990 | Shope ................. 367/2 |
| 5,175,708 | A | | 12/1992 | Dumestre, III ................... 367/3 |
| 5,315,561 | A | * | 5/1994 | Grossi .............. 367/1 |
| 5,579,285 | A | | 11/1996 | Hubert .......... 367/133 |
| 5,633,649 | A | * | 5/1997 | Grossi et al. .......... 343/895 |
| 5,850,187 | A | | 12/1998 | Carrender et al. ....... 340/825.54 |
| 5,883,582 | A | * | 3/1999 | Bowers et al. ........... 340/10.2 |
| 6,058,071 | A | | 5/2000 | Woodall et al. ................ 367/3 |

(Continued)

FOREIGN PATENT DOCUMENTS

GB 2163029 11/1987

(Continued)

*Primary Examiner* — Marceau Milord
(74) *Attorney, Agent, or Firm* — Paul Davis; Goodwin Procter LLP (57) ABSTRACT

The present invention discloses a tagging and identification device and system for tracking and monitoring sea vessels as they enter sea ports, estuaries and/or other channels. The tagging device of the present invention comprises a receiver, for receiving an underwater electromagnetic signal transmitted by an underwater beacon. An acoustic transmitter is provided for transmitting an identification signal to an acoustic receiver deployed nearby. The acoustic identification signal is transmitted after an electromagnetic trigger signal is received from the underwater beacon. The tagging and device may further comprise a memory device which can store data relating to position and time of the see vessel to which it is attached. The tagging and identification device of the present invention is covert, compact and is capable of extended active deployment without replenishment of batteries etc. The identification tagging device and system of the present invention is capable of being deployed for tracking the location of sea vessels without the knowledge of the vessel crew. The system of the present invention allows third a third party to monitor suspect vessels as they enter specific ports or estuaries.

33 Claims, 7 Drawing Sheets

U.S. PATENT DOCUMENTS

| | | | |
|---|---|---|---|
| 6,130,859 A | 10/2000 | Sonnenschein et al. | 367/134 |
| 6,894,614 B2 * | 5/2005 | Eckstein et al. | 340/572.1 |
| 6,933,884 B2 * | 8/2005 | Martin et al. | 342/357.55 |
| 7,043,204 B2 | 5/2006 | Reagor et al. | 455/40 |
| 7,047,114 B1 * | 5/2006 | Rogers | 701/21 |
| 7,081,818 B2 * | 7/2006 | Eckstein et al. | 340/572.1 |
| 7,336,152 B2 * | 2/2008 | Horwitz et al. | 340/10.1 |
| 7,379,388 B2 * | 5/2008 | Graham et al. | 367/118 |
| 7,492,267 B2 | 2/2009 | Bilyeu et al. | 340/5 |
| 7,701,341 B2 * | 4/2010 | Kumar et al. | 340/572.1 |
| 7,711,322 B2 * | 5/2010 | Rhodes et al. | 455/40 |

FOREIGN PATENT DOCUMENTS

WO     WO8704028     7/1987

* cited by examiner

SEA VESSEL TAGGING APPARATUS AND SYSTEM

CROSS-REFERENCE TO RELATED APPLICATION

This application is a continuation in part of U.S. Ser. No. 11/454,630, now U.S. Pat No. 7,711,322 filed Jun. 15, 2006. which claims the benefit of U.S. Ser. Nos. 60/690,964, 60/690,966, and 60/690,959, all filed Jun. 15, 2005. All of the above applications are fully incorporated herein by reference.

FIELD OF USE

The present invention relates to the field of wireless tagging and identification of sea vessels.

DESCRIPTION OF THE RELATED ART

Radio Frequency Identification (RFID) tags are devices which are used for remote wireless identification of a range of objects. RFID tags are interrogated by a radio signal, and they provide a specific response to the interrogation signal. The specific response of the RFID tag is unique to the RFID tag, thus identification of the specific tag is possible.

A wireless identification radio transponder device is taught in U.S. Pat. No. 3,713,148, "Transponder Apparatus and System" Cardullo et al. The transponder taught by Cardullo receives a radio 'interrogation' signal. On receipt of the 'interrogation' signal, the transponder transmits an 'answerback' signal. The 'answerback' signal provides identification of the transponder.

A wireless identification system using RFID tags is described by Carrender et al in U.S. Pat. No. 5,850,187 "Integrated Electronic Tag Reader and Wireless Communication Link". The system taught by Carrender comprises a portable transceiver which transmits a radio interrogation signal to an object having an RFID tag, and can send and receive data from a remote base station.

Systems which are based on the identification of objects using RFID tags may be employed in a range of applications. Such applications include general security, surveillance, monitoring of movement and stock control. For example, a method for tracking and organizing objects to be shipped in shipping containers based on the use of RFID tags is taught by Bilyeu et al in U.S. Pat. No. 7,492,267: "Tracking methods and systems using RFID tags".

The tracking of suspect sea vessels is of particular importance in border security applications. For example, the ability to tag a sea vessel, and to interrogate the tag as the vessel enters particular ports and harbors would provides the ability to monitor the location and movement of the vessel. In particular, the ability to tag a sea vessel and to monitor the location of the vessel covertly would be of particular importance in surveillance missions. Such a system would, for example, provide tracking of sea vessels that are suspected of involvement in contraband, drug trafficking and/or any other illegal border activities.

In principle, RFID tags could be used in for such applications, however ideally the tags would be deployed on a portion of the vessel which is underwater. Underwater deployment of the tag would render it undetectable by the crew of the vessel.

However, the high electrical conductivity of seawater creates problems for the transmission of electromagnetic signals which are required for RFID tags. A typical value for the conductivity of seawater is 4 $S \cdot m^{-1}$. This high electrical conductivity produces a correspondingly high rate of attenuation with distance of a radio signal.

It should be noted, that according to convention, the terms radio signal and electromagnetic signal are interchangeable. In particular, the term radio signal does not merely refer to signals which are used for the transmission of voice signals. For the purpose of clarity, the term electromagnetic signal is used herein.

Electromagnetic signals can be transmitted over short distances and at very low frequencies through sea water. Systems based on low frequency propagation may use magnetically coupled antennas, which provide communications through near-field terms of an electromagnetic or radio signal.

Commonly owned U.S. patent application Ser. No. 11/454, 630, "Underwater Communications System and Method", Rhodes et al., describes a system for communicating underwater by means of low frequency electromagnetic signaling underwater and is incorporated herein by reference. The system of U.S. patent application Ser. No. 11/454,630 is suitable for the transmission of low frequency radio signals underwater. Ranges in the order of one hundred meters through seawater are readily achievable.

A drawback with the system taught by Rhodes is that the transmit antennas for low frequency electromagnetic communications are generally large. Moreover, the transmit signal requires a high level of power in order to be transmitted over a significant distance. Thus, tagging systems based fully on electromagnetic signals for covert underwater tagging and surveillance are infeasible.

U.S. Pat. No. 5,175,708 "Battery Powered Acoustic Transponder for Use in Underwater Environment"; Dumestre, teaches an acoustic transponder for underwater tracking and surveying. The battery powered transponder taught by Dumstre is suitable for applications which are not covert. Unfortunately, acoustic transponders have the drawback that the interrogation signal can easily be heard and detected by crew members. For example, acoustic signals in the audio spectrum can be heard directly by the crew, and ultrasonic signals can be detected by conventional naval listening equipment as sonar.

Thus, there are two opposing factors which act against the provision of a covert and compact underwater tagging system. Electromagnetic systems are covert, but the transmitters are bulky and power hungry. Acoustic systems are compact, however the interrogation signals, are easily detectable by a vessel traversing overhead.

SUMMARY OF THE INVENTION

Accordingly, a first object of the present invention is to provide a sea vessel tagging device which receives and/or is triggered by an electromagnetic signal and which is therefore covert in deployment and in operation.

A second object of the present invention is to provide a sea vessel tagging device which is compact and which can be attached to a sea vessel without detection by the crew or other third parties.

Another object of the present invention is to provide a sea vessel tagging device which is capable of extended active deployment without the need for replenishment of batteries etc.

Yet another object of the present invention is to provide a sea vessel tagging system which is covert in deployment, and which is capable of providing an identification signal for a vessel as it enters a port or estuary without alerting the crew of the vessel that an identification signal has been transmitted.

Accordingly, the present invention provides a tagging device and system for tracking and monitoring sea vessels. The tagging device of the present invention comprises a receiver, for receiving an underwater electromagnetic signal transmitted by an underwater beacon. In some embodiments, an acoustic transmitter is provided for transmitting an identification signal to an acoustic receiver deployed nearby. The acoustic identification signal is transmitted after an electromagnetic trigger signal is received from the underwater beacon. In some embodiments the tagging and identification device further comprises a memory device which can store data relating to position and time of the see vessel to which it is attached.

The tagging and identification device of the present invention meets the requirements of covertness, compactness and is capable of extended active deployment. The identification tagging device and system of the present invention is capable of being deployed for tracking the location of sea vessels without the knowledge of the vessel crew.

DETAILED DESCRIPTION

According to a first aspect, the present invention provides a tagging and identification device for tracking and monitoring sea vessels.

The tagging and identification device of the present invention comprises a receiver for receiving an electromagnetic trigger signal, and an acoustic transmitter for transmitting an acoustic identification signal. The tagging and identification device is triggered by the reception of a low frequency radio signal, which is transmitted by an underwater beacon.

On reception of the electromagnetic trigger signal, the tagging and identification device of the present invention transmits an acoustic identification signal. The acoustic identification signal is received by a remotely located acoustic receiver.

The tagging and identification device of the present invention may be attached to the hull of a sea vessel. Furthermore, the tagging and identification device of the present invention may be attached to a portion of the sea vessel which is below the surface of the water. Several means for attaching and detaching the tagging and identification device of the present invention may be employed: for example, a magnetic mount may be provided for attachment and detachment of the device to a sea vessel hull of a ferrous material.

In some embodiments, the tagging and identification device is powered by a battery. The battery may be integrated in the tagging and identification device, or may be housed externally. In other embodiments, the tagging device is powered by a dynamo which is driven by sea power.

The low frequency electromagnetic trigger signal typically has a carrier frequency in the range from 10 Hz to 10 MHz. Low frequency electromagnetic trigger signals for triggering a tagging device attached to a sea vessel can be transmitted from the seabed without any fear of detection by the passing vessel. Frequencies in the range from 10 Hz to 10 MHz are suitable for the typical ranges required for operation of the present invention. Sea vessels do not incorporate listening equipment for low frequency electromagnetic signals, so a high power electromagnetic trigger or pinging signal can be transmitted without fear of detection by the sea vessel.

The tagging device of the present invention employs a compact receive antenna. In particular, a solenoid formed over a core of a material having a high magnetic permeability provides a highly compact antenna which has a high sensitivity for low-frequency underwater electromagnetic signals. Materials having a magnetic permeability of 10 or greater are available for such applications.

In some embodiments, the tagging device further comprises a memory storage device and a data processor. During operation, the tagging device receives an underwater electromagnetic data signal and data encoded in the data signal is decoded by the processor and stored in the memory storage device. The encoded data may, for example, provide information regarding position and/or time.

According to a second aspect, the present invention provides a tagging and identification system for tracking and monitoring sea vessels as they enter ports, estuaries and/or other sea or fresh water channels. The tagging and identification system of the present invention comprises a tagging and identification device as described herein in the various embodiments of the present invention. The system further comprises at least one beacon which is located on the seabed.

On reception of an electromagnetic trigger signal transmitted by the at least one beacon, the tagging and identification device of the system of the present invention transmits an acoustic identification signal. The acoustic identification signal is received by an acoustic receiver. The acoustic receiver may be remotely located from the underwater beacon, for example on the seabed. Alternatively, the acoustic identification signal may be received by an acoustic receiver which is integrated with the underwater beacon.

In one embodiment, the beacon is activated when a vessel passes overhead. For example, the beacon may be activated by a magnetic sensor, which senses changes or disturbances in the magnetic field as the hull of a sea vessel passes overhead. Alternatively, the beacon may be activated by a pressure sensor, which senses a pressure wave generated by the movement of a sea vessel. Further alternatively, the beacon may be activated by an acoustic sensor, which is activated by the noise generated by a sea vessel engine as it passes overhead. On activation, the beacon transmits an RF trigger signal. The RF trigger signal is typically a low frequency signal, having a carrier frequency in the range from 10 Hz to 10 MHz.

In another embodiment, the beacon transmits continuously. The choice between a continuously transmitting beacon and a beacon which transmits when a sea vessel is nearby is determined by the power source for the beacon. Beacons which are wired to a base unit, can be powered remotely, and therefore can transmit continuously. Beacons which stand alone (without wiring to some base station) are typically activated when a sea vessel passes overhead.

In some embodiments the beacon comprises a magnetically coupled transmit antenna. For example, the antenna may be a loop antenna or a frame antenna comprising multiple windings of insulated electrically conductive wire formed into a loop or rectangle.

According to a third aspect the present invention provides a sea vessel tagging and data storage device comprising a radio receiver, for receiving an underwater electromagnetic data signal transmitted by an underwater transmitter, a memory storage device and a data processor. During operation, the tagging and data storage device receives the underwater electromagnetic data signal and the processor decodes data of the data signal and stores the decoded data in the memory storage device. The data may provide information regarding position and/or time.

According to a fourth aspect, the present invention provides a tagging and data storage system for tracking and monitoring sea vessels as they enter ports, estuaries and/or other sea or fresh water channels. The tagging system of the present invention comprises a tagging device as described herein in the various embodiments of the present invention. The system further comprises at least one beacon which is located on the seabed.

On reception of an electromagnetic data signal transmitted by the at least one beacon, the tagging and data storage device of the system of the present invention decodes the electromagnetic data signal and stores the decoded data in the memory storage device. The data may provide information regarding position and/or time.

Figure 1A:
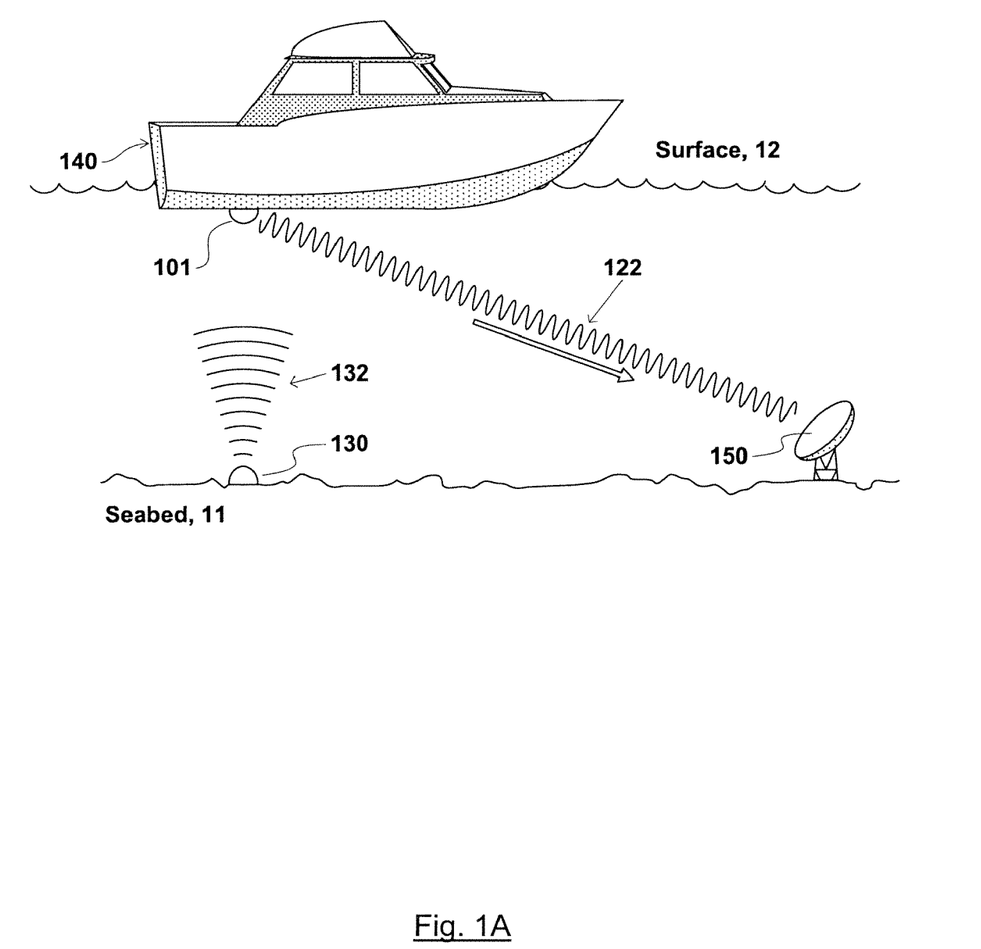
FIG. 1A shows a sea vessel tagging system according to a first exemplary embodiment of the present invention comprising a tagging and identification device deployed on the hull of a sea vessel.

FIG. 1A shows a sea vessel tagging system according to a first exemplary embodiment of the present invention comprising a tagging and identification device 101 deployed on the hull of a sea vessel 140. Tagging device 101 is deployed on a portion of the hull of sea vessel 140 which is below surface of the sea 12. A beacon 130 is located on the seabed 11. In operation, beacon 130, transmits an electromagnetic trigger signal 132 when sea vessel 140 passes overhead. Trigger signal 132 is typically a low frequency electromagnetic signal. For example, an electromagnetic signal having a frequency in the range from 10 Hz to 10 MHz is suitable for the typical ranges required for operation of the present invention.

Electromagnetic trigger signal 132, may be activated automatically as a sea vessel passes overhead. For example, a magnetic sensor (not shown) may be attached to beacon 130, which detects perturbations in the magnetic field around beacon 130 and which activates transmission of trigger signal 132 when such a change is detected. A sea vessel formed of a ferrous material is known to produce such perturbations in the surrounding magnetic field. Other sensors may also be applied to detect a sea vessel passing overhead and for activating the transmission of trigger signal 132 by beacon 130. Such sensors include pressure sensors and acoustic sensors, as would be known to a person skilled in the art.

Alternatively, beacon 130 may be activated externally by a remote control activation signal. Such an activation signal may, in some embodiments, be sent by a remote command station (not show).

Further alternatively, beacon 130, may transmit continuously. The range limitation of electromagnetic signals underwater eliminating any possibility of interference arising from such continuous transmissions.

Beacon 130 may be one of an array of beacons (not shown), and may be hard wired to a remote base station (not shown), which provides power and switching. Alternatively, beacon 130 may be an isolated unit, powered by an integral battery (not shown).

On activation of beacon 130, trigger signal 132 is received by the tagging and identification device 101. On receipt of the electromagnetic trigger signal 132, tagging and identification device 101 transmits an acoustic identification signal 122. The acoustic identification signal 122 is typically a low power ultrasonic signal. The use of low power ultrasonic signals eliminates the potential of detection by the crew of sea vessel 140.

Acoustic identification signal 122 is received by a remote acoustic receiver 150 located on the seabed. Remote acoustic receiver 150 is typically hard wired to a base station (not shown).

In alternative embodiments, control and data signals from a remote base station to any of beacon 101, and acoustic receiver 150 are sent via wireless communications. For example, low frequency electromagnetic signaling may be employed for such wireless links.

Figure 1B:
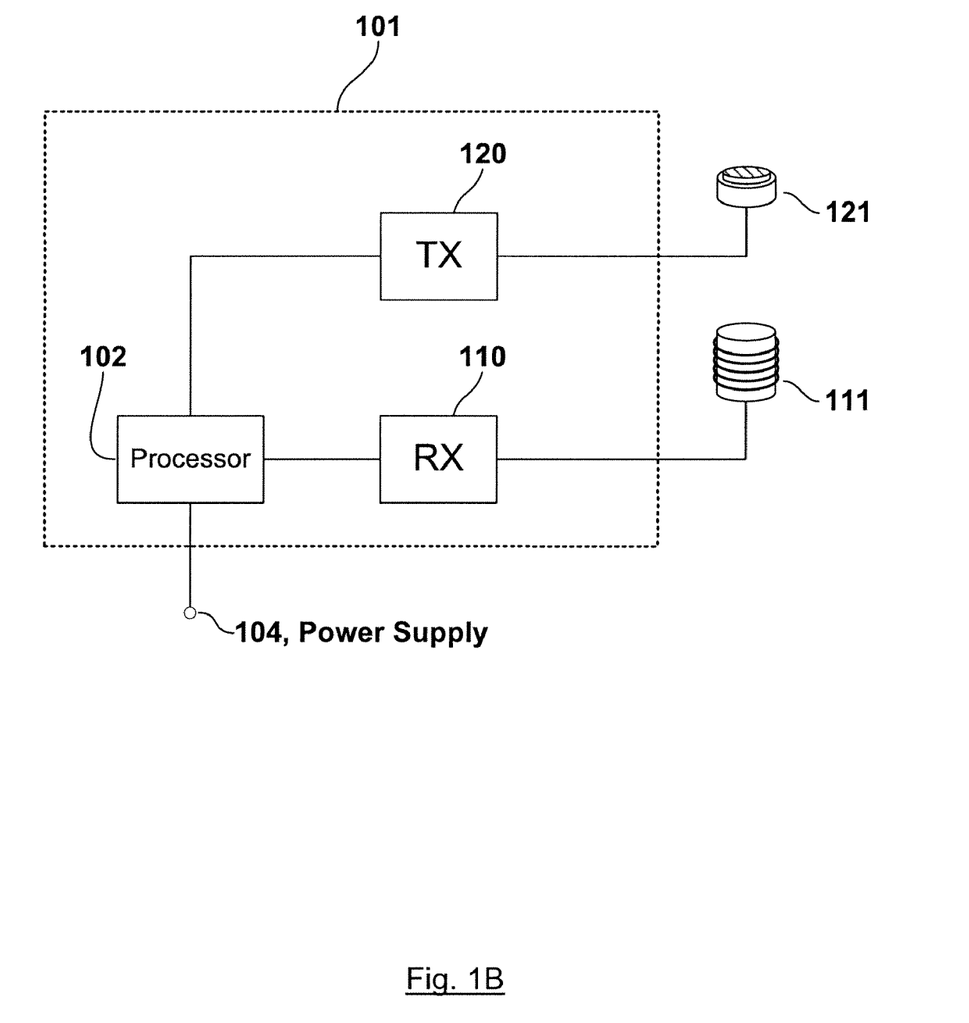
FIG. 1B shows a block diagram of a hybrid sea vessel tagging and identification device according to a first exemplary embodiment of the present invention and as shown in FIG. 1A.

FIG. 1B shows a block diagram of a hybrid sea vessel tagging and identification device 101 according to the first exemplary embodiment of the system of the present invention and shown in FIG. 1A.

Tagging and identification device 101 comprises antenna 111 for receiving low frequency electromagnetic signal 132, transmitted by beacon 130 (FIG. 1A) located on the seabed. The received signal is passed to receiver 110. An output from receiver 110 is processed by processor 102.

Antenna 111 may be a magnetically coupled antenna. For example, a suitable antenna might comprise a solenoid wound over a cylindrical ferrite core. The use of a solenoid comprising multiple windings of insulated electrically conducting wire provides the benefit of increased sensitivity. Moreover, the use of a core of a material having a high magnetic permeability (such as ferrite) also provides the benefit of increased sensitivity of antenna 111.

Reception of trigger signal 132 by processor 102 via receiver 110 and antenna 111 triggers acoustic transmitter 120 to transmit a pre-programmed identification signal. The acoustic identification signal is transmitted by acoustic antenna 121. The acoustic identification signal may, for example, be a low power ultrasonic signal.

Tagging and identification device 101 further comprises a power supply input 104. Power supply input 104 feeds power from a battery (not shown) or any form of electric charge accumulator cell. Alternatively, power supply input may feed power from a dynamo (not shown) which is powered by the motion of vessel 104 (FIG. 1A) as it passes through the water. A range of compact power supply schemes may alternatively be employed. Nonetheless, the present invention is optimized for low power consumption by the use of an electromagnetic trigger signal and an acoustic identification signal. Thus, tagging and identification device 101 is capable of operating over a long power cycle as would be required for surveillance, monitoring and tracking of a sea vessel over a long period of time.

The configuration of the tagging and identification device and system of the present invention and depicted in FIG. 1A and FIG. 1B, where the trigger signal is a low-frequency electromagnetic signal and the tagging and identification signal is an acoustic signal takes advantage of benefits of each separate system.

For example, the tagging and identification device of the present invention cannot be triggered by an acoustic signal. Acoustic pinging systems are easily detected by a vessel using on board monitoring systems. Thus, a system which was triggered by the transmission of an acoustic signal by a beacon located on the seabed would alert the ship crew that surveillance activity is taking place.

On the other hand, low frequency electromagnetic signals cannot be detected by crew members of a passing sea vessel. Sea vessels do not generally listen for radio signals transmitted underwater, because such signals are known to have a limited propagation range. Moreover, low frequency radio signals cannot penetrate the hull of a sea vessel, so even if a crew were to scan to the relevant portion of the radio spectrum using radio equipment, they could not determine that the monitoring of the vessel was taking place via the trigger signal.

Thus, the transmission of an electromagnetic trigger signal by an underwater beacon, and the reception thereof by a tagging and identification device attached to the underside of a sea vessel according to the present invention, cannot be detected by the ship crew.

As regards the transmission of the tagging and identification signal, a low frequency radio transmitter which transmits electromagnetic signals would not be a suitable option for this purpose.

A low frequency radio transmitter would be prohibitively large and a tagging and identification device which comprised such a transmitter would be easily detected. Underwater low frequency radio transmitters operate at high power levels so that the signals can travel over long distances. Moreover, the transmission of low frequency electromagnetic signals requires the use of large transmit antennas.

By contrast, an acoustic transmitter operating in the ultrasonic region can be extremely compact. In particular, an acoustic transmitter can be low powered and compact if it is required only to transmit a directional ultrasonic signal. Thus acoustic signaling is the best option for transmitting the tagging and identification signal.

The present invention is realized through the benefits of electromagnetic and acoustic signaling apparatus, but without their respective drawbacks. The present invention provides a tagging and identification device or system for monitoring sea vessels entering ports and channels based on the reception of electromagnetic signals from a beacon by the tagging device and by the transmission of low power acoustic identification signals to a remote acoustic receiver. The tagging and identification device is compact, so can be attached to a vessel without the knowledge of the crew. The device is capable of extended active deployment. In operation, the tagging and identification device does not alert the crew to the fact that their vessel is being monitored.

Figure 2:
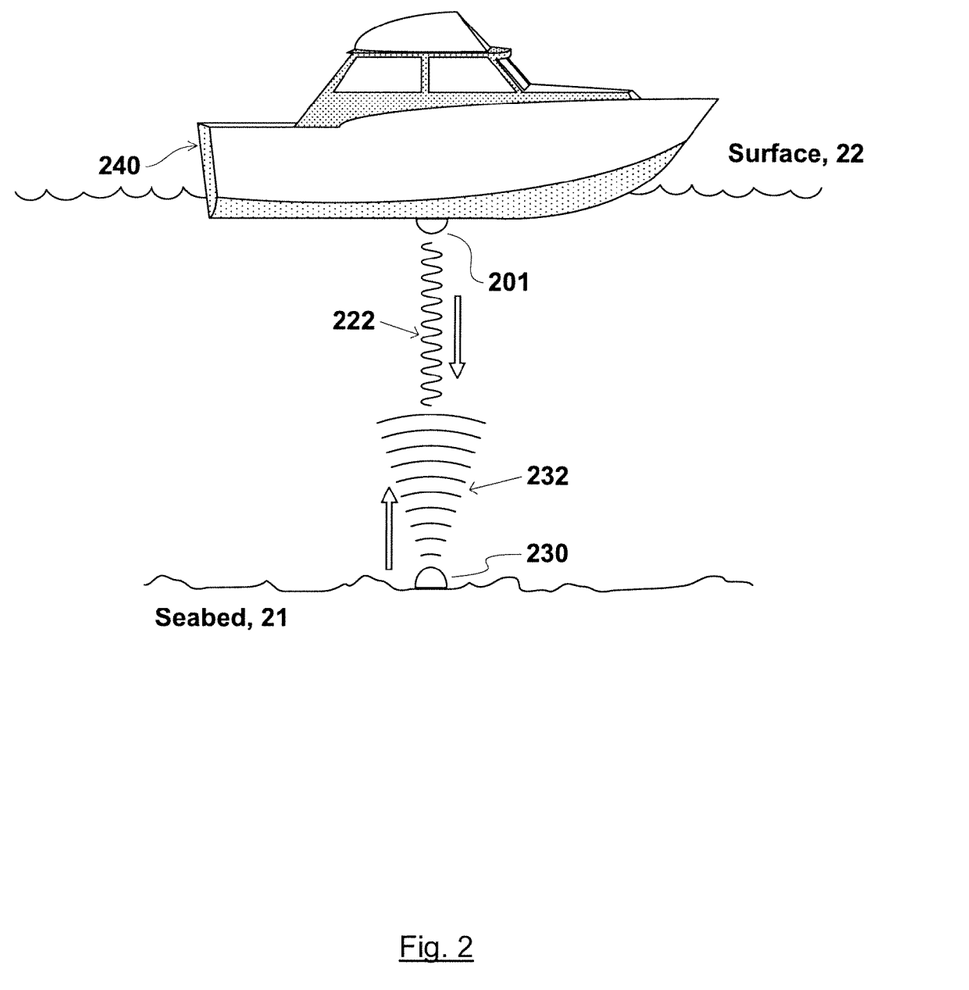
FIG. 2 shows a diagram of a sea vessel tagging system comprising a tagging and identification device deployed on the hull of a sea vessel according to a second exemplary embodiment of the present invention.

FIG. 2 shows a diagram of a sea vessel tagging system comprising a tagging and identification device 201 deployed on the hull of a sea vessel 240 according to a second exemplary embodiment of the present invention.

Tagging and identification device 201 is attached to the underside of vessel 240, and is located below the surface of the sea 22. A hybrid transceiver 230 is located on the seabed 21. In operation, hybrid transceiver 230, transmits an electromagnetic trigger signal 232 when a sea vessel passes overhead.

Electromagnetic trigger signal 232, may be activated automatically as the vessel passes overhead. For example, by magnetic sensors (not shown), pressure sensors or acoustic sensors, as would be known to a person skilled in the art. Alternatively, hybrid transceiver 230 may be activated externally by a remotely sent activation signal. Such an activation signal may, in some embodiments be sent by a remote command station. Further alternatively, hybrid transceiver 230 may transmit continuously.

Trigger signal 232 is received by the tagging and identification device 201 attached to the underside of vessel 240. On receipt of the electromagnetic trigger signal 232, tagging and identification device 201 transmits an acoustic identification signal 222. Acoustic identification signal 222 is received by an acoustic receiver integral to hybrid transceiver 230.

Trigger signal 232 is typically a low frequency electromagnetic signal. For example an electromagnetic signal having a frequency in the range from 10 Hz to 10 MHz is suitable for the operation of the system depicted in FIG. 2.

Hybrid transceiver 230 is typically hard wired to a remote base station (not shown) where data decoded from the acoustic identification signal can be stored and analyzed.

In alternative embodiments, control signals from a remote base station to hybrid transceiver 201 may be sent by a wireless link. Low frequency electromagnetic signaling may be employed for such wireless links.

Figure 3:
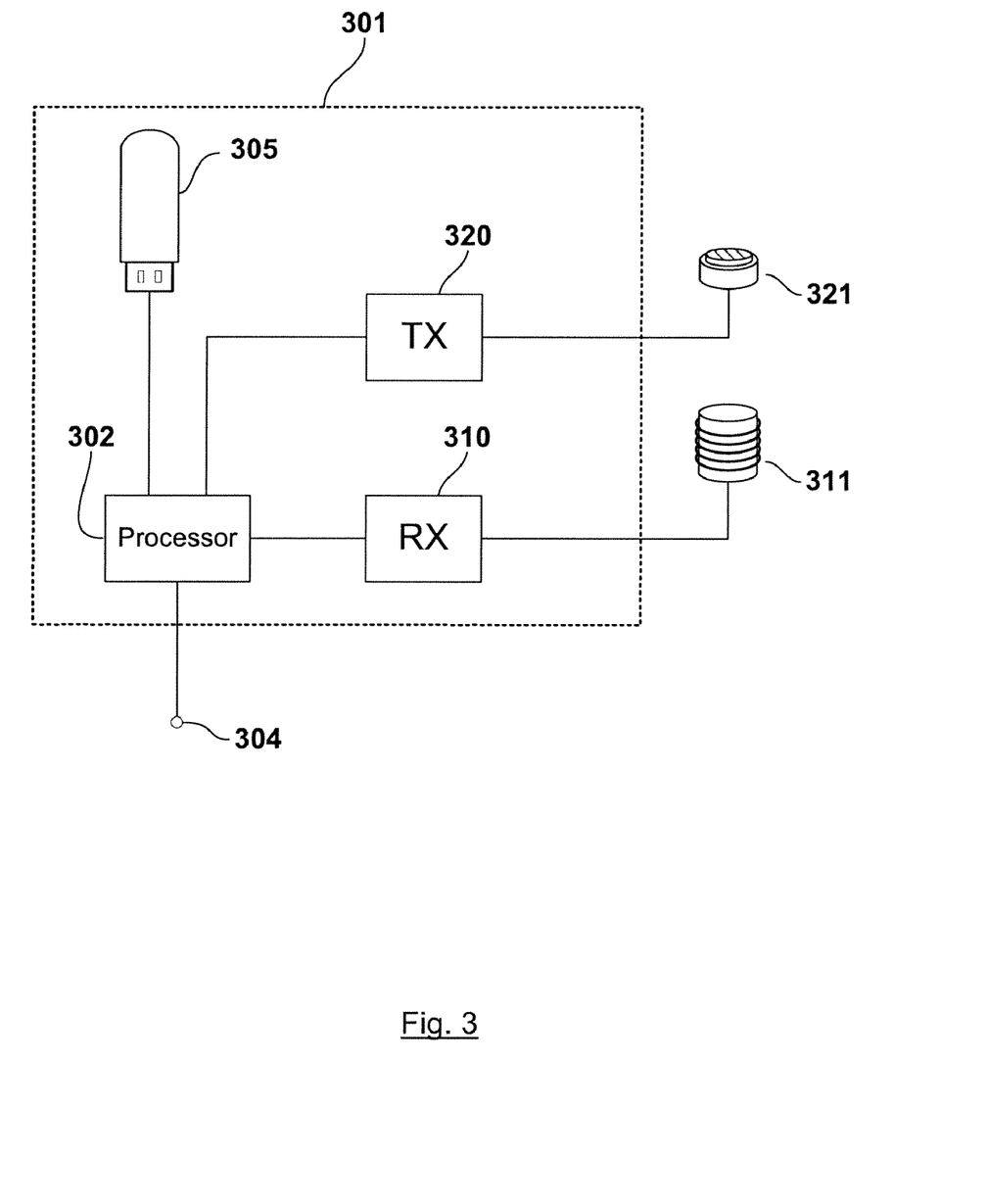
FIG. 3 shows a block diagram of a sea vessel tagging and data storage device according to a third exemplary embodiment of the present invention.

FIG. 3 shows a block diagram of a sea vessel tagging and data storage device according to a third exemplary embodiment of the present invention.

Tagging and data storage device 301 comprises antenna 311 for receiving a low frequency electromagnetic signal, transmitted by a radio beacon. The received signal is passed to receiver 310. An output from receiver 310 is fed to processor 302.

Antenna 311 may be a magnetically coupled antenna. A suitable antenna for receiving a low frequency electromagnetic signal a solenoid formed of insulated electrically conductive wire wound over a cylindrical ferrite core.

The low frequency electromagnetic signal, received by antenna 311 may be one of a trigger signal and a data signal.

Reception by processor 302 of a data signal via receiver 310 and antenna 311 triggers processor 302 to decode the data signal and store encoded data in memory device 305. The encoded data may include data relating to position and time. Specifically, the data may provide co-ordinates of the underwater beacon, and the time of transmission.

On the other hand, reception by processor 302 of a trigger signal via receiver 310 and antenna 311 triggers acoustic transmitter 320 to transmit a pre-programmed identification signal. The acoustic identification signal is transmitted by acoustic antenna 321. The acoustic identification signal may be a low power ultrasonic signal.

In some cases, reception by processor 302 of a trigger signal via receiver 310 and antenna 311 triggers acoustic transmitter 320 to transmit a pre-programmed identification signal followed by an encoded signal comprising the data stored in memory device 305. In this way, the tagging and data storage device 301 of FIG. 3 is configured to download a record of previous locations of the vessel which were recorded in memory device 305 on previous occasions when the sea vessel passed over other radio beacons transmitting low frequency trigger signals.

Tagging and data storage device 301 further comprises a power supply input 304. Power supply input 304 may feed power from a battery (not shown) or any form of electric charge accumulator cell. Alternatively, power supply input 304 may feed power from a dynamo (not shown) which is powered by the motion of the vessel as it passes through the water.

In another embodiment, acoustic transmitter 320 and acoustic antenna 321 of FIG. 3 are omitted. The tagging and data storage device according to this embodiment (not shown) decodes data encoded in a received electromagnetic signal and stores the data in memory device 305. Stored data may be downloaded manually when the tagging and data storage device is removed from the sea vessel to which it was attached during deployment.

Figure 4:
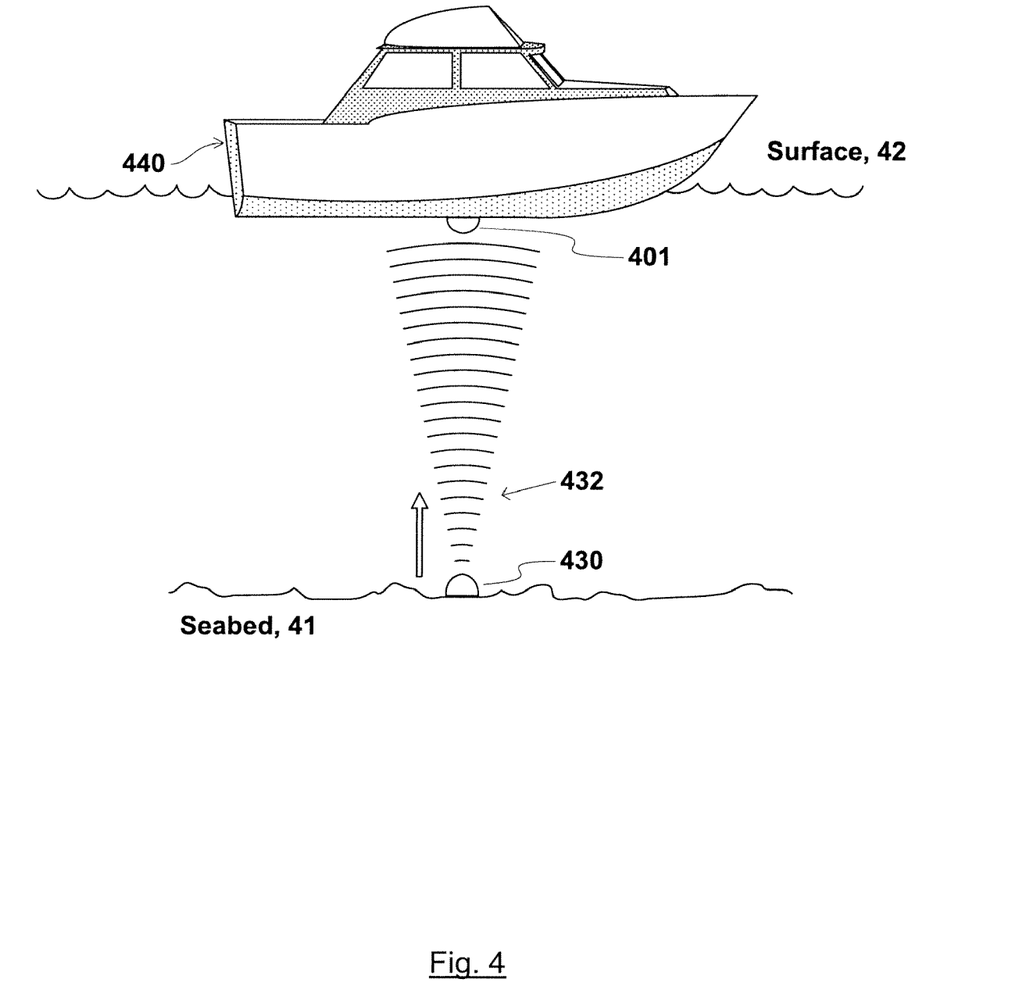
FIG. 4 shows a sea vessel tagging system comprising a tagging and data storage device deployed on the hull of a sea vessel according to a third exemplary embodiment of the present invention.

FIG. 4 shows a sea vessel tagging system comprising a tagging and data storage device 401 deployed on the hull of a sea vessel 440 according to a third exemplary embodiment of the present invention.

Tagging and data storage device 401 is attached to the underside of vessel 440, and is located below the surface of the sea 42. A beacon 430 is located on the seabed 41. In operation, beacon 430, transmits an electromagnetic data signal 432 when sea vessel 440 passes overhead.

Electromagnetic data signal 432, may be activated automatically as the sea vessel 440 passes overhead. For example, by magnetic sensors, pressure sensors or acoustic sensors, as would be known to a person skilled in the art. Alternatively, beacon 430 may be activated externally by remote control activation signal. Such an activation signal may, in some embodiments be sent by a remote base station (not shown). Further alternatively, electromagnetic data signal may be transmitted continuously.

Electromagnetic signal 432 is received by the tagging and data storage device 401. On receipt of the electromagnetic data signal 432, a integral processor of tagging and data storage device 401 decodes electromagnetic data signal 432 and stores data thereof in an integral memory device (not shown).

The encoded data of electromagnetic data signal 432 may include data relating to position and time. Specifically, the data may provide co-ordinates of the underwater beacon 430, and the time of transmission.

Electromagnetic data signal 432 is typically a low frequency electromagnetic signal. For example an electromagnetic signal having a frequency in the range from 10 Hz to 10 MHz.

Figure 5:
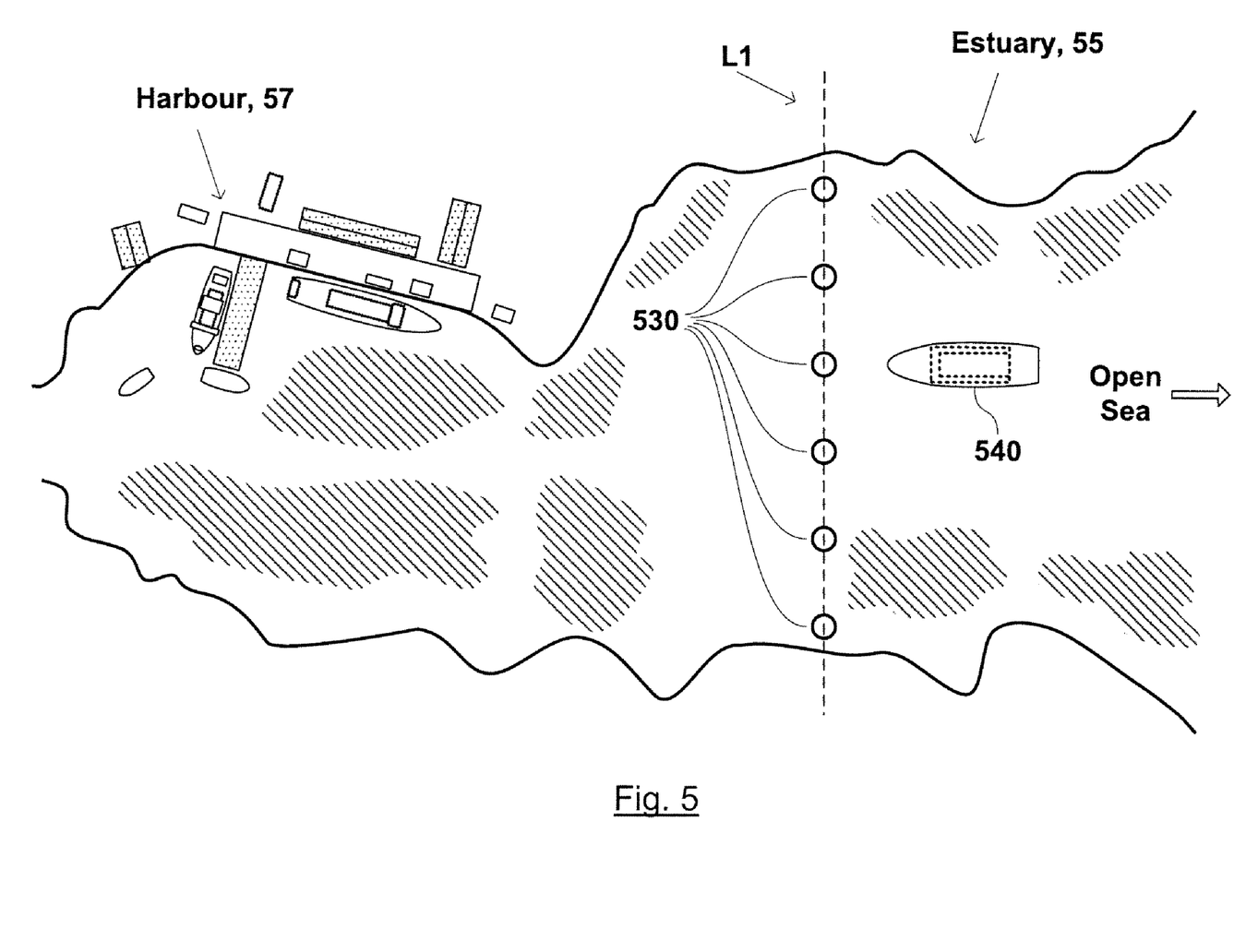
FIG. 5 shows an array of sea vessel beacons disposed in an array about the entrance to a sea estuary configured to transmit electromagnetic trigger and/or data signals to tagging devices attached to sea vessels as they pass.

FIG. 5 shows a system for sea vessel tagging comprising an array of sea vessel beacons 530 disposed in a line L1 across the entrance to a sea estuary 55. The system for sea vessel tagging of FIG. 5 is configured to transmit electromagnetic trigger and/or data signals to tagging devices which are attached to sea vessels according to the present invention and as described in the various embodiments described herein. The electromagnetic trigger and/or data signals are received by the tagging devices as the sea vessels pass array 530 forming line L1.

A harbor 57 is located inside the line L1 defined by the array of sea vessel beacons 530. The system for sea vessel tagging of FIG. 5 is operable to track the movement of sea vessels into and out of harbor 57.

The array of sea vessel beacons 530 are arranged so as to provide a contiguous line of coverage across path for a sea vessel 540 into and/or out of the estuary. That is, there is a specific range within which a tag attached to the hull of a vessel 540 can receive electromagnetic trigger and/or data signals transmitted by the separate beacons of array 530. The separate beacons of array 530 are positioned so that a tag attached to the hull of sea vessel 540 is always within the range of at least one beacon of array 530 when it crosses line L1

The electromagnetic trigger and/or data signals transmitted by beacons of array 530 typically have carrier frequencies in the range from 10 Hz to 10 MHz. Such low frequency electromagnetic signals which are received by a tagging device attached to sea vessel 540 are not detected by the crew or listening equipment of the passing vessel 540.

Figure 6:
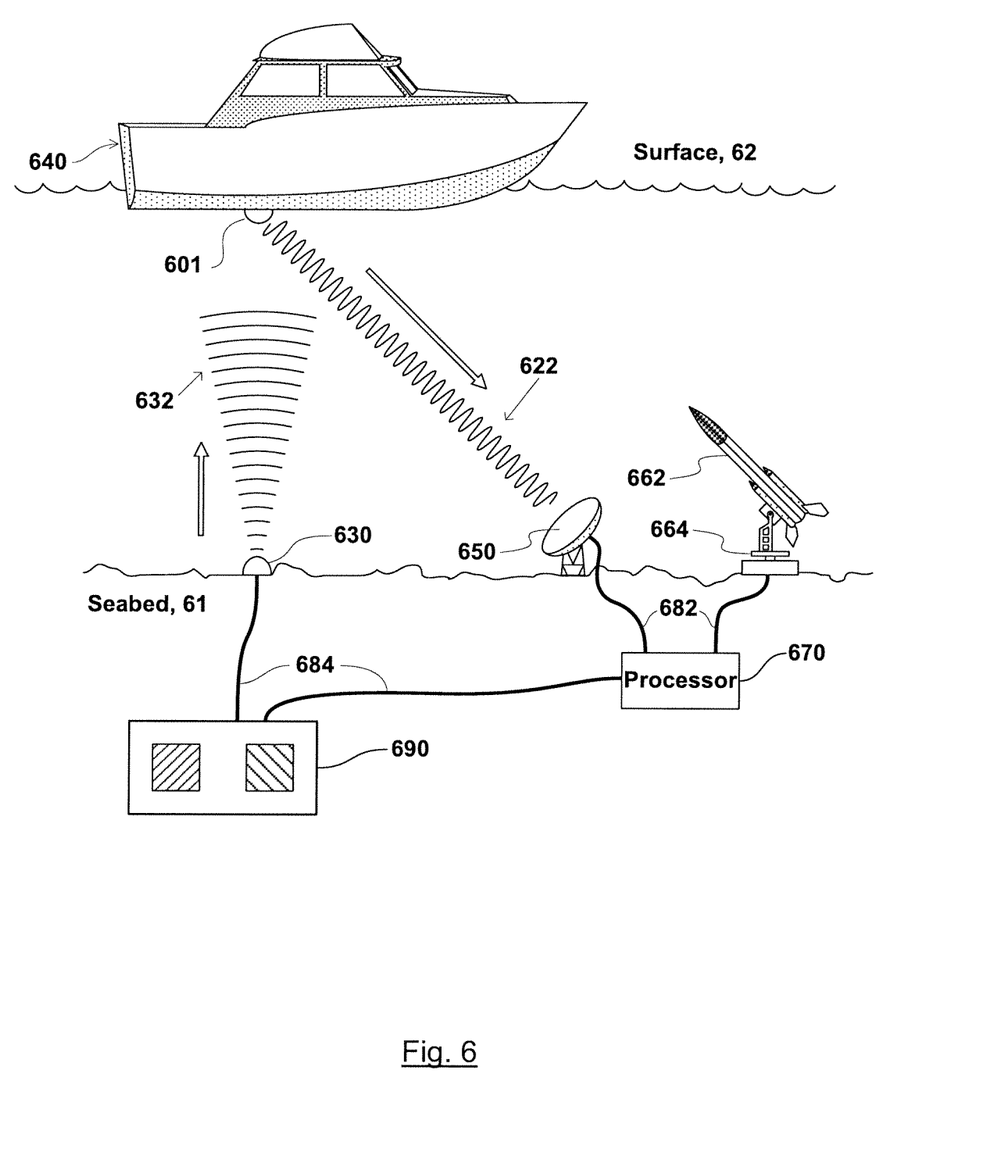
FIG. 6 shows a sea vessel tagging system comprising a tagging device deployed on the hull of a sea vessel, and a torpedo launcher according to a fourth exemplary embodiment of the present invention.

FIG. 6 shows a sea vessel tagging system comprising a tagging device 601 deployed on the hull of a sea vessel 640, a beacon 630 and an acoustic receiver 650 according to a fourth exemplary embodiment of the present invention. Tagging device 601 is deployed on a portion of the hull of sea vessel 640 which is below surface of the sea 62. Beacon 630 and acoustic receiver 650 are both located on the seabed 61.

The sea vessel tagging system of FIG. 6 additionally comprises an a torpedo launcher 662 mounted on a base 664 located on the seabed. Base 664 provides adjustment of both angle and elevation for the launch of a torpedo. Acoustic receiver 650 and torpedo launcher 662 are connected to a processor 670 via electrical cables 682.

In operation, beacon 630, transmits an electromagnetic trigger signal 632, which is received by tagging and identification device 601. Trigger signal 632 is typically a low frequency electromagnetic signal. For example, an electromagnetic signal having a frequency in the range from 10 Hz to 10 MHz.

On activation, electromagnetic trigger signal 632 is received by the tagging and identification device 601 attached to the hull of sea vessel 640. On receipt of the electromagnetic trigger signal 632, tagging and identification device 601 transmits an acoustic identification signal 622. Acoustic identification signal 622 is received by a remote acoustic receiver 650 located on the seabed. Acoustic identification signal 622 may be a low power ultrasonic signal. The use of low power ultrasonic signals eliminates the potential of detection by the crew of sea vessel 640.

In the sea vessel tagging system embodying the present invention depicted in FIG. 6 beacon 630 is wired to remote base station 690, which may provide power and manual activation of electromagnetic trigger signal 632. Remote base station 690 is also wired to acoustic receiver 650 via processor 670. Wiring from remote base station 690 to beacon 601 and processor 670 is via electrical cables 684.

Base station 690 may be located on dry land, or on the surface of the sea 62, or at any suitable location for the control and monitoring of vessels pass.

In alternative embodiments, control signals from remote base station 690 to any of beacon 601, processor 670 and acoustic receiver 650 may be sent via wireless communications. For example, low frequency electromagnetic signaling may be employed for such wireless links.

Electromagnetic trigger signal 632, may also be activated automatically as a sea vessel passes overhead. For example, one or more of, a magnetic sensor, a pressure sensor and acoustic sensor may be employed to detect the presence of passing sea vessel 640, as would be known to a person skilled in the art.

Remote acoustic receiver 650 is hard wired to base station 690 via processor 670. Processor 670 is also wired to torpedo launcher 662. When a particular acoustic identification signal 622 is received by processor 670, a command signal may be sent to torpedo launcher 662 by processor 670 to fire a torpedo at sea vessel 640.

Alternatively, a command to launch a torpedo at sea vessel 640 may be sent from remote base station 690. Thus, the sea vessel tagging system embodying the present invention depicted in FIG. 6 is operable to tag the movement of a sea vessel 640, to monitor the passage of a sea vessel passing over beacon 630, to transmit an acoustic identification to a remote acoustic receiver 650, and to launch a torpedo from launcher 662 against sea vessel 640.

The present invention, embodied in the various figures and descriptions described herein, provides a sea vessel tagging device which receives electromagnetic signals, which transmits acoustic identification signals and/or which can decode and store data which is encoded in the electromagnetic signal. The sea vessel tagging device of the present invention is compact, and can be attached to a sea vessel without detection by the crew or other third parties. Moreover, the sea vessel tagging device extended active deployment without the need for replenishment of batteries etc.

The present invention, embodied in the various figures and descriptions described herein, further provides a sea vessel tagging system which is covert in deployment and operation and which is capable of extended active deployment. The system of the present invention is capable of providing an acoustic signal identifying a sea vessel on reception of an electromagnetic trigger signal transmitted by a remotely located beacon. The system can track a sea vessel as it enters a port or estuary without alerting the crew of the vessel that an identification signal has been transmitted.

The system of the present invention additionally can record and store data relating to a sea vessel as it enters and exits ports. Data is decoded from an electromagnetic data signal transmitted by a remotely located beacon and may include time and position data. Stored data can be downloaded via an acoustic signal transmitted by the tagging device on reception of an electromagnetic trigger signal transmitted by a remotely located beacon.

Embodiments of the underwater radio antenna of the present invention are described herein with particular emphasis on seawater environments. However, the present invention is equally suited for use in fresh water environments. Optimization of the present invention to suit particular water constitutions remains within the scope of the present invention.

The descriptions of the specific embodiments herein are made by way of example only and not for the purposes of limitation. It will be obvious to a person skilled in the art that in order to achieve some or most of the advantages of the present invention, practical implementations may not necessarily be exactly as exemplified and can include variations within the scope of the present invention.

What is claimed is:

1. An underwater tagging and identification device for a sea vessel comprising:
    a radio receiver for receiving an underwater electromagnetic trigger signal transmitted by an underwater beacon;
    an acoustic transmitter for transmitting an acoustic identification signal to a remote underwater acoustic receiver;
    a memory storage device; and
    a data processor;
    wherein during operation, said tagging and identification device receives an underwater electromagnetic data signal and data encoded in said data signal is decoded by said processor and stored in said memory storage device; and said acoustic transmitter transmits said identification signal when triggered by reception of said underwater electromagnetic trigger signal by said radio receiver.

2. A sea vessel tagging and identification device according to claim 1 wherein said encoded data provides information regarding position and/or time.

3. A sea vessel tagging and identification device according to claim 1 further comprising a detachable mount.

4. A sea vessel tagging and identification device according to claim 1 wherein said detachable mount is a magnetic mount.

5. A sea vessel tagging and identification device according to claim 1 wherein said tagging and identification device is powered by a battery.

6. A sea vessel tagging and identification device according to claim 1 wherein said tagging device is powered by a dynamo driven by sea power.

7. A sea vessel tagging and identification device according to claim 1 wherein said radio receiver comprises a solenoid formed over a core of a material having a high magnetic permeability.

8. A system for sea vessel tagging and identification comprising:
    a sea vessel tagging and identification device comprising a radio receiver for receiving an underwater electromagnetic trigger signal, an acoustic transmitter for transmitting an acoustic identification signal, a memory storage device, and a data processor;
    at least one beacon located underwater which transmits an electromagnetic trigger signal;
    wherein during operation, said tagging and identification device receives an underwater electromagnetic data signal and data encoded in said data signal is decoded by said processor and stored in said memory storage device; and said acoustic transmitter transmits said identification signal on reception of said underwater electromagnetic trigger signal by said radio receiver.

9. A system for sea vessel tagging and identification according to claim 8 further comprising a remote underwater acoustic receiver for receiving said acoustic identification signal.

10. A system for sea vessel tagging and identification according to claim 9 wherein said remote underwater acoustic receiver and said at least one beacon are integrated into a single unit.

11. A system for sea vessel tagging and identification according to claim 9 wherein said underwater acoustic receiver sends said identification signal to a remote base station.

12. A system for sea vessel tagging and identification according to claim 11 wherein said underwater acoustic receiver is directly wired to said remote base station.

13. A system for sea vessel tagging and identification according to claim 11 programmed to command the launch of a torpedo at said sea vessel on receipt of a given acoustic identification signal from said tagging and identification device.

14. A system for sea vessel tagging and identification according to claim 9 further comprising a torpedo launcher connected to said underwater acoustic receiver via a processor.

15. A system for sea vessel tagging and identification according to claim 14 wherein said processor is programmed to launch a torpedo at said sea vessel on receipt of a given acoustic identification signal from said tagging and identification device.

16. A system for sea vessel tagging and identification according to claim 8 wherein said beacon is activated by one or more sensors which detect the presence of a sea vessel.

17. A system for sea vessel tagging and identification according to claim 16 wherein said sensors are any one of a magnetic sensor, a pressure sensor or an acoustic sensor.

18. A system for sea vessel tagging and identification according to claim 8 wherein said beacon transmits continuously.

19. A system for sea vessel tagging and identification according to claim 8 further comprising a plurality of beacons.

20. A system for sea vessel tagging and identification according to claim 19 wherein said plurality of beacons are disposed on the seabed so as to form a contiguous monitoring zone.

21. A system for sea vessel tagging and identification according to claim 20 wherein said contiguous monitoring zone is located at the entry to a port, a harbour or an estuary.

22. A system for sea vessel tagging and identification according to claim 8 wherein said sea vessel tagging and identification device is attached to a portion of a sea vessel which is below water.

23. A sea vessel tagging and data storage device comprising:
- a radio receiver, for receiving an underwater electromagnetic data signal transmitted by an underwater transmitter;
- an acoustic transmitter for transmitting stored data to a remote underwater acoustic receiver;
- a memory storage device and a data processor;
- wherein during operation said tagging device receives said underwater electromagnetic data signal and said processor decodes data of said data signal and stores said decoded data in said memory storage device; and said acoustic transmitter transmits stored data to said remote underwater acoustic receiver on reception by said radio receiver of an underwater electromagnetic trigger signal transmitted by said underwater transmitter.

24. A sea vessel tagging and data storage device according to claim 23 wherein said encoded data provides information regarding position and/or time.

25. A system for sea vessel tagging comprising:
- a sea vessel tagging and data storage device comprising a radio receiver for receiving an underwater electromagnetic data signal transmitted by an underwater transmitter;
- a memory storage device and a data processor;
- an acoustic transmitter for transmitting stored data to a remote underwater acoustic receiver;
- at least one beacon located underwater which transmits an electromagnetic data signal;
- wherein during operation said tagging and data storage device receives said underwater electromagnetic data signal; said processor decodes data of said data signal and stores said decoded data in said memory storage device; and said acoustic transmitter transmits stored data to said remote underwater acoustic receiver on reception by said radio receiver of an underwater electromagnetic trigger signal transmitted by said underwater transmitter.

26. A system for sea vessel tagging according to claim 25 wherein said at least one beacon is activated by one or more sensors which detect the presence of a sea vessel.

27. A system for sea vessel tagging and identification according to claim 26 wherein said sensors are any one of a magnetic sensor, a pressure sensor or an acoustic sensor.

28. A system for sea vessel tagging according to claim 25 further comprising a plurality of beacons.

29. A system for sea vessel tagging according to claim 28 wherein said plurality of beacons are disposed on the seabed so as to form a contiguous monitoring zone.

30. A system for sea vessel tagging according to claim 29 wherein said contiguous monitoring zone is located at the entry to a port, a harbour or an estuary.

31. A system for sea vessel tagging according to claim 25 wherein said sea vessel tagging and data storage device is attached to a portion of a sea vessel which is below water.

32. A method for sea vessel tagging comprising the steps of:
- attaching a tagging and identification device to a sea vessel, the device comprising
- a radio receiver for receiving an underwater electromagnetic trigger signal transmitted by an underwater beacon, an acoustic transmitter for transmitting an acoustic identification signal to a remote underwater acoustic receiver,
- a memory storage device and a data processor;
- reception of an underwater electromagnetic data signal;
- decoding of data encoded in said data signal by said processor;
- storing decoded data in said memory storage device;
- transmission of an electromagnetic trigger signal by a beacon located underwater to a radio receiver of said tagging and identification device;
- transmission of an acoustic identification signal by said tagging device to a remote underwater acoustic receiver.

33. A method for sea vessel tagging comprising the steps of:
- attaching a tagging and data storage device to a sea vessel, the device comprising a radio receiver for receiving an underwater electromagnetic data signal transmitted by an underwater transmitter; a memory storage device, a data processor, an acoustic transmitter for transmitting stored data to a remote underwater acoustic receiver and
- a beacon located underwater;
- transmission of an electromagnetic data signal by said beacon located underwater to said radio receiver of said tagging and identification device;
- decoding of said data signal by said data processor of said radio receiver;
- storage of decoded data of said data signal by a memory storage device of said tagging device;
- transmission of an underwater electromagnetic trigger signal by said underwater transmitter;
- transmission of stored data to said remote underwater acoustic receiver on reception of said underwater electromagnetic trigger signal.

* * * * *